(12) United States Patent
Kaertner et al.

(10) Patent No.: US 7,839,905 B2
(45) Date of Patent: Nov. 23, 2010

(54) CARRIER-ENVELOPE PHASE SHIFT USING LINEAR MEDIA

(75) Inventors: Franz X. Kaertner, Newton, MA (US); Richard Ell, Oberkirch (DE)

(73) Assignee: Massachusetts Institute of Technology, Cambridge, MA (US)

( * ) Notice: Subject to any disclaimer, the term of this patent is extended or adjusted under 35 U.S.C. 154(b) by 987 days.

(21) Appl. No.: 11/608,666

(22) Filed: Dec. 8, 2006

(65) Prior Publication Data

US 2007/0217542 A1 Sep. 20, 2007

Related U.S. Application Data

(60) Provisional application No. 60/748,858, filed on Dec. 9, 2005.

(51) Int. Cl.
*H01S 3/10* (2006.01)

(52) U.S. Cl. .............................. 372/25; 372/18; 359/615

(58) Field of Classification Search ................. 359/615; 372/18, 25
See application file for complete search history.

(56) References Cited

U.S. PATENT DOCUMENTS

| | | | | | |
|---|---|---|---|---|---|
| 4,097,818 | A | * | 6/1978 | Manoukian et al. | 372/19 |
| 4,597,634 | A | * | 7/1986 | Steenblik | 359/478 |
| 5,579,177 | A | * | 11/1996 | Stumpf | 359/837 |
| 5,602,677 | A | * | 2/1997 | Tournois | 359/566 |
| 5,966,390 | A | * | 10/1999 | Stingl et al. | 372/18 |
| 6,038,055 | A | | 3/2000 | Hänsch et al. | 359/279 |
| 6,480,330 | B1 | * | 11/2002 | McClay et al. | 359/359 |
| 6,686,879 | B2 | * | 2/2004 | Shattil | 342/367 |
| 6,785,303 | B1 | | 8/2004 | Holzwarth et al. | 372/16 |
| 6,989,901 | B2 | * | 1/2006 | Abbink | 356/451 |
| 7,388,669 | B2 | * | 6/2008 | Abbink | 356/455 |
| 7,418,017 | B2 | * | 8/2008 | Holzwarth et al. | 372/29.023 |
| 7,474,457 | B2 | * | 1/2009 | Krausz et al. | 359/326 |
| 7,555,023 | B2 | * | 6/2009 | Ell et al. | 372/18 |

(Continued)

FOREIGN PATENT DOCUMENTS

JP 2004279495 A * 10/2004

(Continued)

OTHER PUBLICATIONS

Eckstein et al., "High-resolution two-photon spectroscopy with picosecond light pulses", *Physical Rev. Lett.*, 40(13):847 -850 (1978).

(Continued)

*Primary Examiner*—Mark Consilvio
(74) *Attorney, Agent, or Firm*—Modern Times Legal; Robert J. Sayre

(57) ABSTRACT

The carrier-envelope phase in a train of optical pulses is varied utilizing the dispersive properties of lossless plates while the total dispersion in transmission is maintained practically constant. The plates include sloped surfaces and are mounted for displacement such that the ratio of the thicknesses of the two plates through which the optical pulses will pass can be varied by displacing the plates so as to shift the carrier-envelope phase in the optical pulses. In one embodiment, the plates include a barium fluoride wedge and a fumed silica wedge, wherein the wedges are bond together to form a composite structure with thicker and thinner portions of the wedges inversely matched.

17 Claims, 8 Drawing Sheets

U.S. PATENT DOCUMENTS

| | | | |
|---|---|---|---|
| 2004/0017833 A1* | 1/2004 | Cundiff et al. | 372/18 |
| 2007/0086493 A1* | 4/2007 | Apolonski et al. | 372/18 |
| 2010/0040097 A1* | 2/2010 | Verhoef | 372/25 |

FOREIGN PATENT DOCUMENTS

| | | |
|---|---|---|
| WO | WO 2009135870 A1 * | 11/2009 |

OTHER PUBLICATIONS

Ell et al., "Carrier-envelope phase control by a composite plate", *Optics Express*, 14(12):5829-5837 (2006).

Morgner et al., "Nonlinear optics with phase-controlled pulses in the sub-two-cycle regime", *Phys. Rev. Lett.*, 86(24):5462-5465 (2001).

Mücke et al., "Self-referenced 200 MHz octave-spanning ti:sapphire laser with 50 attosecond carrier-envelope phase jitter", *Optics Express*, 13(13):5163-5169 (2005).

Paulus et al., "Measurement of the phase of few-cycle laser pulses", *Phys. Rev. Lett.*, 91(25):253004-1253004-4 (2003).

International Search Report and the Written Opinion of the International Searching Authority for PCT/US2006/047048, mailed Apr. 11, 2007.

* cited by examiner

CARRIER-ENVELOPE PHASE SHIFT USING LINEAR MEDIA

RELATED APPLICATION

This application claims the benefit of U.S. Provisional Application No. 60/748,858 filed Dec. 9, 2005, the entire teachings of which are incorporated herein by reference.

GOVERNMENT SUPPORT

The invention was supported, in whole or in part, by a grant, N00014-02-1-0717, from the Office of Naval Research. The Government has certain rights in the invention.

BACKGROUND

Optical pulses have an electric field associated therewith. As shown in FIG. 1, the electrical field can be described as a high-frequency oscillation, known as the "carrier" (or "carrier-wave") 12. The carrier 12 is contained within a lower-frequency "envelope" 14. As shown, the carrier peak magnitude 16 and the envelope peak magnitude 18 are not always aligned, and the difference in relative position between the carrier and the envelope is known as the offset phase. The offset phase can shift as the optical pulses pass through a medium in which the carrier and envelope propagate at different speeds.

Only recently, it became possible to completely control the temporal evolution of the electric light field of a train of mode-locked laser pulses. Mastering the manipulation of phase and magnitude of the electric field has been made possible by technological advances in femtosecond laser technology and nonlinear optics together with ground-breaking ideas and insights in the field of precision spectroscopy with pulsed laser sources. This unprecedented high level of control enables a wide range of new applications in science and technology. Time domain applications focus on studies of physical phenomena directly depending on the electric field rather than on the pulse envelope only. Examples of such applications include carrier-wave Rabi-flopping, quantum interference of photocurrents, photoemission from metal surfaces, or electron emission from ionized atoms. Furthermore, attosecond physics has been made accessible by using carrier-envelope-offset-frequency-controlled femtosecond pulses to generate coherent light in the deep UV and X-ray spectral regions in a well-controlled manner. Analogously, the high degree of control of the electric field is also very beneficial for applications in the frequency domain where the laser spectrum, composed of discrete longitudinal modes, is being used for pioneering experiments in optical frequency metrology.

SUMMARY

As described, herein, a pair of plates, either joined as a composite structure or separate, have surfaces that are sloped to produce thinner and thicker portions. The plates have similar refractive indices and exhibit similar second order dispersions of an optical pulse; the ratios of the group and phase velocities for the optical pulse in the two plates, however, substantially differ. The plates can be aligned such that the thinner portion of one plate is aligned with the thicker portion of the other plate, and vice versa. As the plates are displaced (e.g., within a plane or rotationally) in the path of a train of optical pulses, the optical pulses will travel through a shifting ratio of the respective thicknesses of the two plates. By changing this ratio, the offset of the carrier with respect to the envelope can be changed (and set to any frequency between zero and the frequency of the repetition rate, $f_{rep}$) while keeping dispersion substantially constant and, therefore, without producing a substantial change in the energy, spectrum, shape or duration of the optical pulse.

This capacity for governing the offset is very important since, on one hand, many experiments require particular values for the carrier-envelope-offset frequency, $f_{CEO}$, due to frequency selective detection schemes or pulse-picking constraints for successive amplification. In addition, very often, technical constraints of detection and/or control electronics make a free choice of $f_{CEO}$ very attractive.

In many applications utilizing carrier-envelope-phase-controlled oscillators with or without successive amplification, it is technically very attractive to fully control the carrier-envelope phase or its temporal evolution $f_{CEO}$ without alteration of pulse energy, pulse spectrum or pulse duration which is not possible by pure material insertion of removal.

By implementation of a novel composite plate we establish a method to arbitrarily shift the carrier-envelope offset phase while keeping dispersion in transmission practically constant. We first prove the principle by varying the carrier-envelope phase in an interferometric autocorrelator measuring a series of ultrashort (~6 fs) autocorrelations. To be able to set the carrier-envelope offset frequency $f_{CEO}$ to any desired value between zero and the repetition frequency, we use the novel plate inside a 200 MHz, octave-spanning Ti:sapphire laser and demonstrate a variation of $f_{CEO}$ by half the repetition frequency. Over the whole demonstrated tuning range, pulse energy and spectrum stay nearly unaltered.

Besides the demonstrated applications, the composite plate is helpful in many applications where a precise and "neutral" control of the carrier-envelope phase is desirable, such as in high-harmonic generation or ionization experiments. The composite plate also is beneficial for compensation of (temporal) long term drifts in the carrier-envelope phase.

Figure 1:
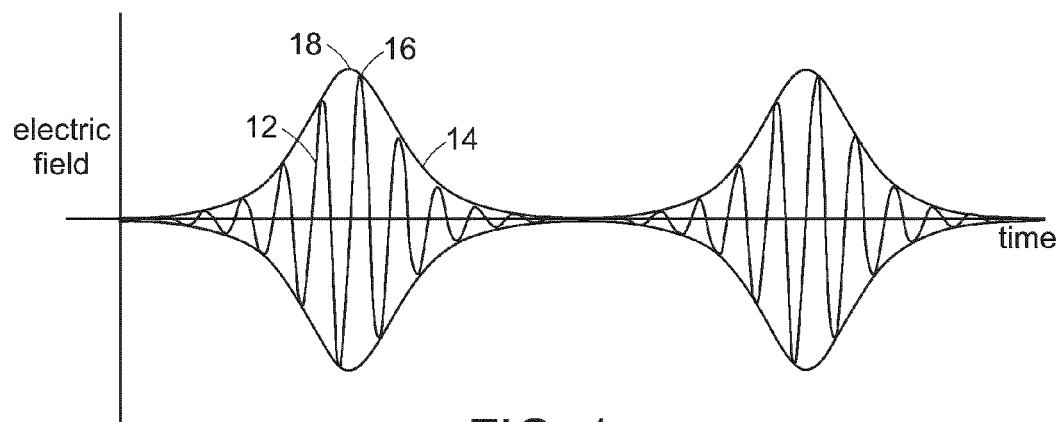
FIG. 1 is an illustration of a carrier and envelope.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

A) The Carrier-Envelope Offset Frequency

The real electric field, $E(z,t)$, of a laser pulse may be decomposed into $$E(z,t) = Re\{A(z,t)e^{i(\omega_0 t + k(\omega_0)z)}e^{i\phi(t)}e^{i\phi_{CEO}}\} \quad (1)$$

with $A(z,t)$ representing the real envelope and the following exponential describing the oscillation with the carrier frequency, $\omega_0$, where the time-dependent phase term, $\phi(t)$, describes the chirp of the pulse and $\phi_{CEO}$ describes the phase between the maximum 16 of the carrier-wave 12 and the maximum 18 of the envelope 14 (as shown in FIG. 1)—the so-called carrier-envelope phase. During propagation of the wave-packet, the carrier-wave propagates with the phase velocity, $v_p$, and the envelope 14 propagates with the group velocity, $v_g$. Since all media, and even air, exhibit a wavelength-dependent index of refraction, phase and group velocity through a medium are generally different. As a consequence, $\phi_{CEO}$ changes continuously over time. The carrier-envelope phase shift, $\Delta\phi$, caused by passing through a dispersive medium of length, z, can be expressed as $$\Delta\phi = 2\pi \cdot \frac{c}{\lambda}\left(\frac{1}{v_p} - \frac{1}{v_g}\right) \cdot z = 2\pi \cdot \frac{dn}{d\lambda} \cdot z \quad (2)$$

with n representing the index of refraction of the medium described by the corresponding Sellmeier equations. The above phase shift, $\Delta\phi$, is solely due to linear propagation of the wave-packet in media such as glass, the laser crystal or air. Besides this linear effect, also nonlinear effects give rise to a relative phase shift between the carrier 12 and the envelope 14. The most prominent effect in femtosecond lasers is the third-order Kerr nonlinearity responsible for self-phase modulation (SPM) leading to spectral broadening, whereas the spatial Kerr effect is exploited in Kerr-lens mode-locking (KLM). It can be shown that the Kerr effect leads to a self-phase shift of the carrier 12 similar to the soliton self-phase shift in fiber optics. Furthermore, the Kerr effect induces a distortion of the envelope 14, called self-steepening, causing a shift of the envelope 14 with respect to the underlying carrier-wave 12.

During the periodic propagation of the laser pulses inside a laser cavity, the carrier-envelope phase is different for each emitted laser pulse since the total phase shift, $\Delta\phi$, accumulated per round trip is generally not an integer multiple of $2\pi$. In other words, this means that the envelope 14 repeats itself after each roundtrip, while the carrier-wave 12 is different for successive pulses and repeats itself with the frequency, $f_{CEO}$—the carrier-envelope offset (CEO) frequency, $$f_{CEO} = \frac{\Delta\phi}{2\pi}f_{rep} \quad (3)$$

where $f_{rep}$ is the fundamental pulse repetition frequency. Changing the linear or nonlinear contributions to the phase shift, $\Delta\phi$, inside the laser cavity changes the CEO frequency.

B) The Combined Plates for Arbitrary Carrier-Envelop Phase Control

There are two well-established ways to influence the value of the carrier-envelope offset frequency, $f_{CEO}$. First, the pump power of the laser can be changed to change the pulse energy and, hence, the nonlinear contribution to the phase shift, $\Delta\phi_{nonl}$. Typical values of the conversion factor measured in 200-MHz octave-spanning lasers are on the order of 15-20 MHz per Watt of pump power variation. Varying $f_{CEO}$ over the whole repetition rate of 200 MHz is, therefore, impracticable absent a capacity to vary the pump power by 10 W. For lower and higher repetition rates, the conversion factor scales accordingly and never allows a variation of $f_{CEO}$ over the full repetition frequency. This scheme is extremely useful in locking $f_{CEO}$ to a reference frequency by modulating the pump power via an acousto-optic modulator. Since the operation within a closed control loop only necessitates pump power modulation on the order of a few percent, the nonlinear phase shift, $\Delta\phi_{nonl}$, can be exploited in a very efficient manner.

A second method of changing $f_{CEO}$ is via material dispersion according to Eq. (2). The carrier-envelope offset frequency, $f_{CEO}$, is changed, for example, by moving a wedged $BaF_2$ plate and thereby changing the material insertion. Varying the carrier-envelope phase by $2\pi$ (and, hence, varying $f_{CEO}$ between 0 and $f_{rep}$) is achieved by introducing (or removing) roughly 80 µm of $BaF_2$. An alternative is to rotate a glass plate (formed, e.g., of fused silica) that is operated close to Brewster's angle—in which case, a material thickness variation of approximately 60 µm is utilized.

Figure 2:
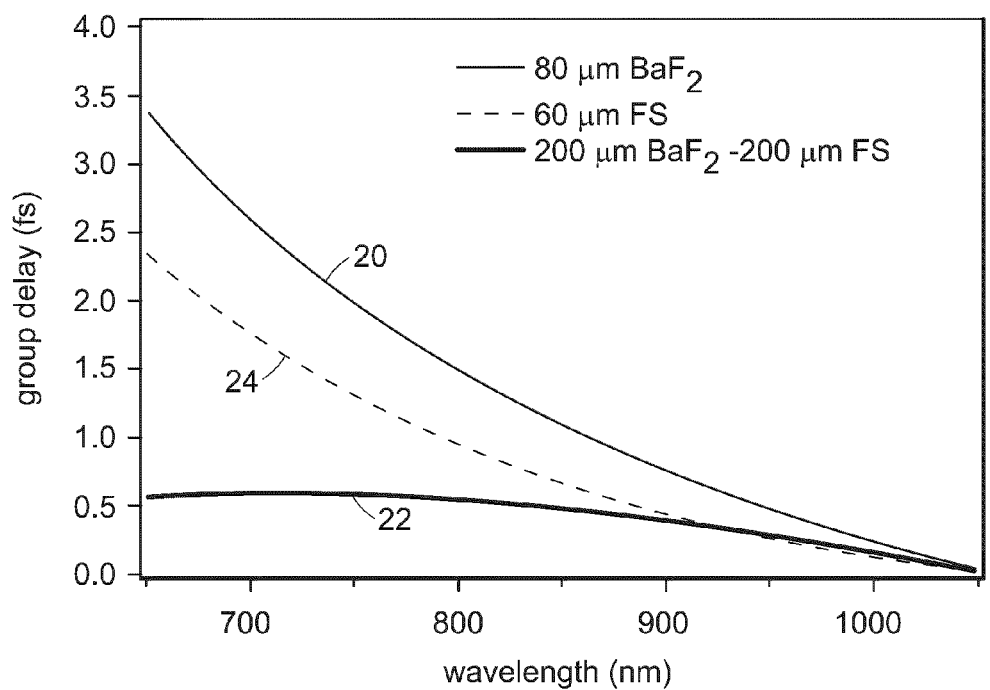
FIG. 2 is a graph that charts the change of the group delay over the relevant spectral range when varying the carrier-envelope phase by $2\pi$.

As shown in FIG. 2, the group delay over the relevant spectral range changes when varying the carrier-envelope phase by $2\pi$. The top curve 20 shows the effect of inserting 80 µm of $BaF_2$ into the optical path to vary the carrier-envelope phase by simply changing material insertion, whereas the bottom curve 22 displays the effective group delay variation when using a composite wedge made of fused silica and $BaF_2$. Meanwhile, the middle curve 24 shows the group delay as a function of wavelength when 60 µm of fused silica is inserted into the optical path.

The main problem associated with the previous approach using single-material insertion or removal is that, unavoidably, one simultaneously also changes the dispersion properties of the corresponding plate experienced by the transmitted femtosecond laser beam. FIG. 2 shows theoretical calculations as to how the group delay changes when the carrier-envelope phase is varied by $2\pi$. Shown is the relevant spectral range supporting a short, few-cycle pulse inside the cavity on the order of about 5 femtoseconds (fs). Due to pure material insertion (or removal) of 80 µm of $BaF_2$ or 60 µm of fused silica, the pulse experiences a group delay variation of around 3.5 fs and 2.5 fs, respectively, which is not negligible considering the pulse duration of only about 5 fs. In terms of second order dispersion, this corresponds to a change of 3 $fs^2$ and 2.2 $fs^2$, respectively in the group delay dispersion (GDD) at 800 nm. The kind of dispersion-managed femtosecond lasers that are relevant for this discussion operate with close to zero second order dispersion a few fs² above or below zero GDD. Accordingly, a change of 2-3 fs², as introduced by the few tens of microns of solitary $BaF_2$ or fused silica has a serious impact on the laser dynamics and, hence, on pulse spectrum and energy. Employing the mentioned $BaF_2$ wedges, alone, in the lasers, precludes the ability to tune $f_{CEO}$ over the full repetition rate. Due to the varying dispersion, the pulse spectrum and energy are strongly modified; and the laser finally becomes unstable, or the signal-to-noise ratio of the $f_{CEO}$ beat decreases dramatically.

The approach here is not to remove or insert a single glass material but, rather, to replace one kind of material with a different kind of material. By doing so, second order dispersion is kept nearly constant; consequently, alteration of pulse energy, spectrum and $f_{CEO}$ beat signal strength is substantially reduced.

Figure 3:
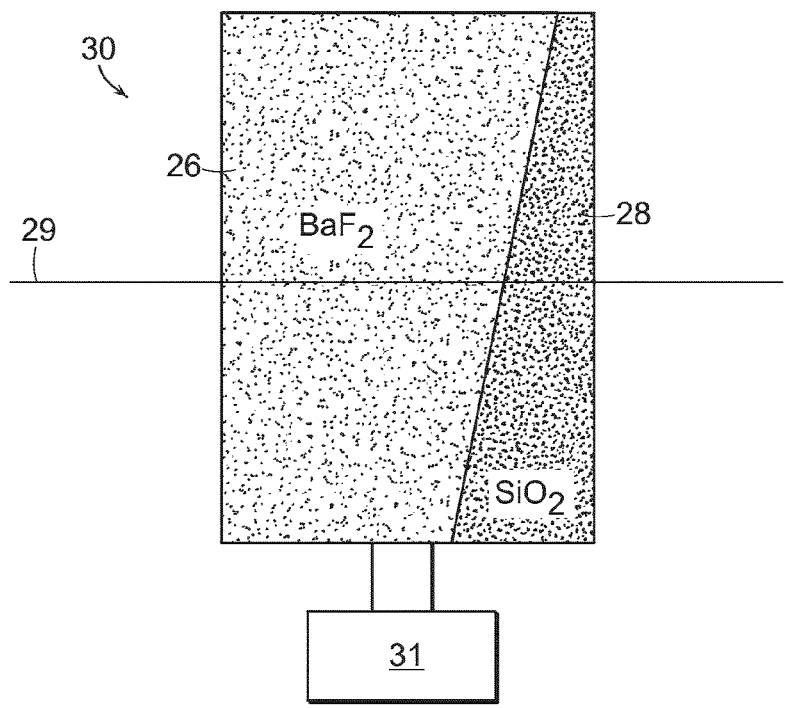
FIG. 3 is an exaggerated illustration of a "phase-plate" composite structure including a thick barium fluoride wedge and a thinner fused silica wedge.

A (not-to-scale) top view of a composite "phase-plate" comprising a thick $BaF_2$ wedge 26 and a thinner fused silica wedge 28 is illustrated in FIG. 3. In other embodiments, different material combinations with refractive indices and second order dispersions that are very close for the two materials but with greater differences in their ratios of group and phase velocities are used. For example, in one embodiment, calcium fluoride ($CaF_2$) is used as one of the wedges. In the illustrated embodiment, the inversely oriented wedges 26 and 28 are glued together to form a composite plate 30. Alternatively, the wedges 26 and 28 can be spaced apart (not joined). The composite plate 30 was used in the experiments, described herein. The thickness of the composite plate 30 (measured horizontally, as shown) is exaggerated relative to the length (measured vertically, as shown) of roughly one inch (25 mm). The composite plate 30 is 10 mm in height (measured orthogonally to the illustrated view); and the laser beam passes through both materials in the plane of the drawing along an optical path 29, and a displacement mechanism 31 (e.g., a linear-displacement motor) for displacing the composite plate 30 in a direction orthogonal to the optical path 29 to change the ratio of thicknesses of the two wedges 26 and 28 through which the optical pulses pass.

Figure 4:
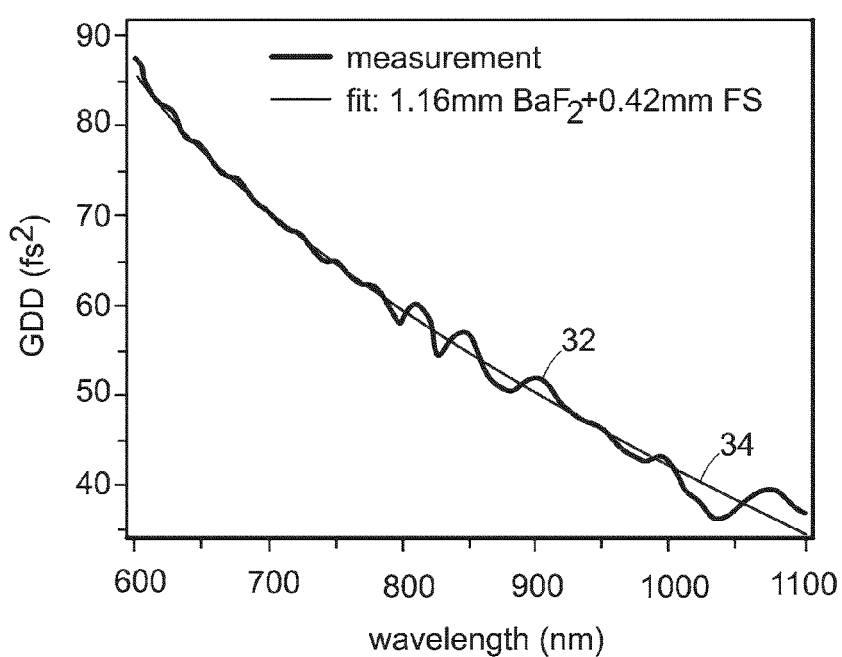
FIG. 4 is a graph that measures the average second order dispersion in the composite wedge structure and fit.

Using a white light interferometer, the dispersion of the composite plate 30 was measured. An average of four measurements of group delay dispersion (or second order dispersion) is shown in FIG. 4 as line 32 and represents the dispersion in the center of the composite plate 30. A fit 34 gives information about the composition of the composite plate 30. $BaF_2$ is a preferred material for intracavity dispersion management since it has the highest ratio of second- to third order dispersion at 800 nm; and, additionally, the dispersion of 0.5 mm of $BaF_2$ is similar to that of 1 m of air, allowing for an easy scaling of the laser to higher repetition rates. The chart reveals a total thickness for the composite plate 30 of 1.58 mm.

Moving the composite plate, along its length, continuously replaces $BaF_2$ 30 with fused silica 28 or vice versa. Eq. (2) is used to calculate that the replacement of 200 µm of fused silica with the same amount of $BaF_2$ allows a shift of $2\pi$ in the carrier-envelope phase, whereas the impact on second order dispersion is negligible (+/−0.4 fs² at 800 nm). The bottom curve 22 in FIG. 2 confirms that the alteration in group delay is significantly smaller in comparison to the direct use of pure material insertion/removal.

C) Adjusting the Carrier-Envelope Phase in an Interferometric Autocorrelator

To first prove the functionality of the wedges 26 and 28 independent of any sensitive laser dynamics, the composite plate 30 was incorporated into an interferometric autocorr-elator suitable for sub-10-fs pulse characterization. Femtosecond autocorrelators (AC) are usually built such that dispersion is balanced in both arms to avoid distortion of the measurement result. In interferometric autocorrelators, in particular, identical optical paths in both arms of the Michelson interferometer are also required for a symmetrical interferometric autocorrelation (IAC) trace, as predicted by theory. By introducing the composite plate into one arm of the autocorrelator allows us to vary the carrier-envelope phase with respect to the second arm, thereby leading to asymmetric and/or double-peaked interferometric autocorrelations.

Figure 5:
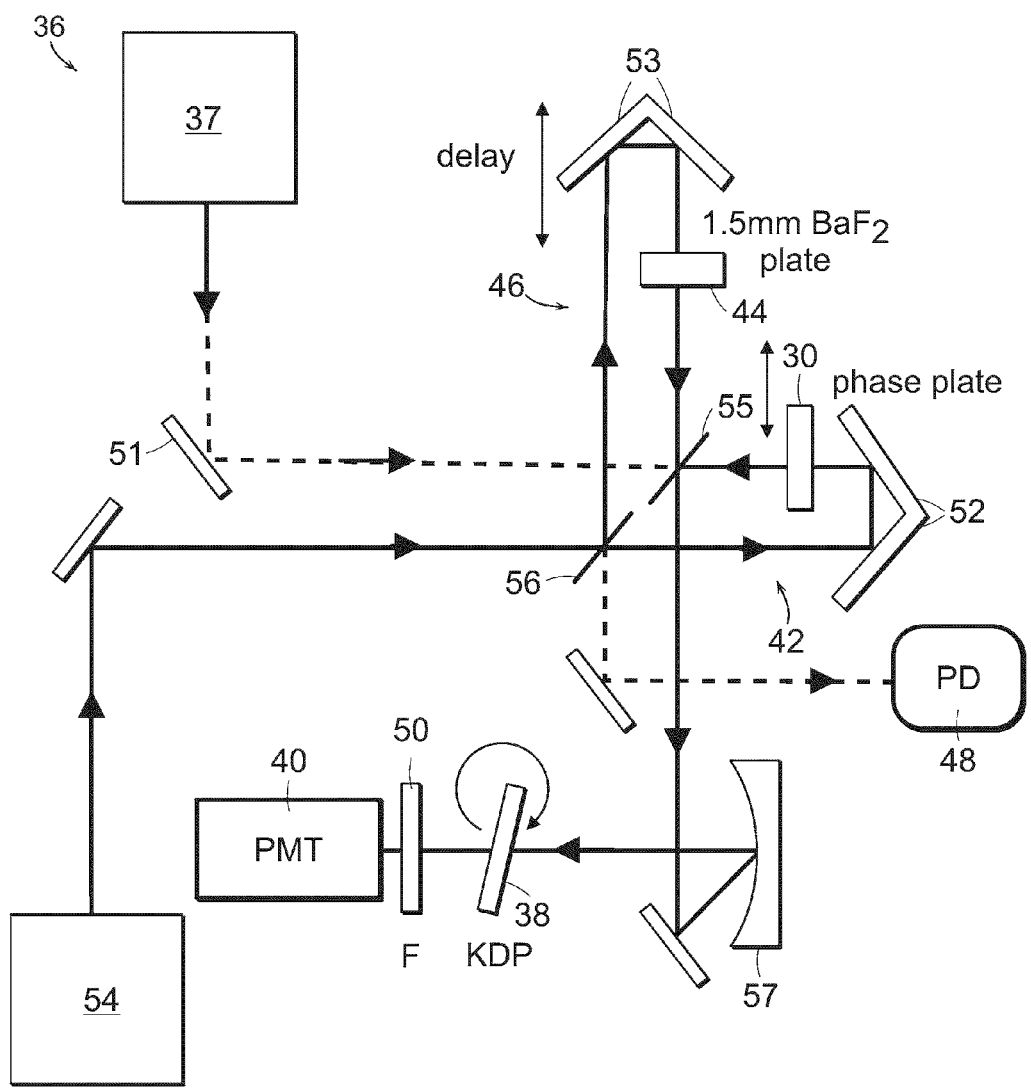
FIG. 5 is a schematic illustration of the layout for an interferometric autocorrelator used to demonstrate the functionality of the plates.

The layout of the autocorrelator 36 used for these experiments is sketched in FIG. 5—i.e., a standard balanced autocorrelator with an additional input port for a calibration laser 37 that enables calibration of the time axis. A thin type-I potassium-dihydrogen-phosphate (KDP) crystal was used as the nonlinear medium 38 to generate a second harmonic detected by a photomultiplier tube 40. The composite plate 30 was introduced in a first arm 42, whereas a sole $BaF_2$ plate 44 of the same dispersion was placed into the second arm 46. The autocorrelator also includes a photodiode 48 for the calibration (reference) laser 37, which is used to calibrate the delay (i.e., the time axis) and a filter 50 to block fundamental light. This configuration afforded pre-compensation for the additional chirp introduced by the composite plate 30 (and by the $BaF_2$ plate 44) by a bounce on dispersion-compensating mirrors 51. For these experiments, a mirror-only ultrabroadband titanium-sapphire (Ti:sapphire) laser 54 with a full-width-at-half-maximum (FWHM) optical bandwidth of more than 300 nm (available from VENTEON UB, NanoLayers Optical Coatings GmbH, Germany, http://www.nanolayers.de/) was used.

A pair of 50/50 broadband beamsplitters 55 and 56 split the incoming pulses from lasers 37 and 54 (reflecting half and transmitting half), respectively, along two orthogonal pathways toward respective mirrors 52 and 53, each of which laterally shifted the incoming optical pulses (from mirror 55/56) over to a second pathway and then back along the second pathway (which intersects the other mirror 56/55) Though the pulse trains from the respective lasers 37 and 54 traveled common pathways, the system is configured such that the pulse trains travel in opposite directions over the common pathways in the two arms 42 and 46. Consequently, only the optical pulse train originating from the laser 54 was directed through the nonlinear medium 38 en route to its detection in the photomultiplier tube 40, while the optical pulse train originating from the calibration laser 37 was independently directed to the photodiode 48 for a separate measurement.

Figure 6:
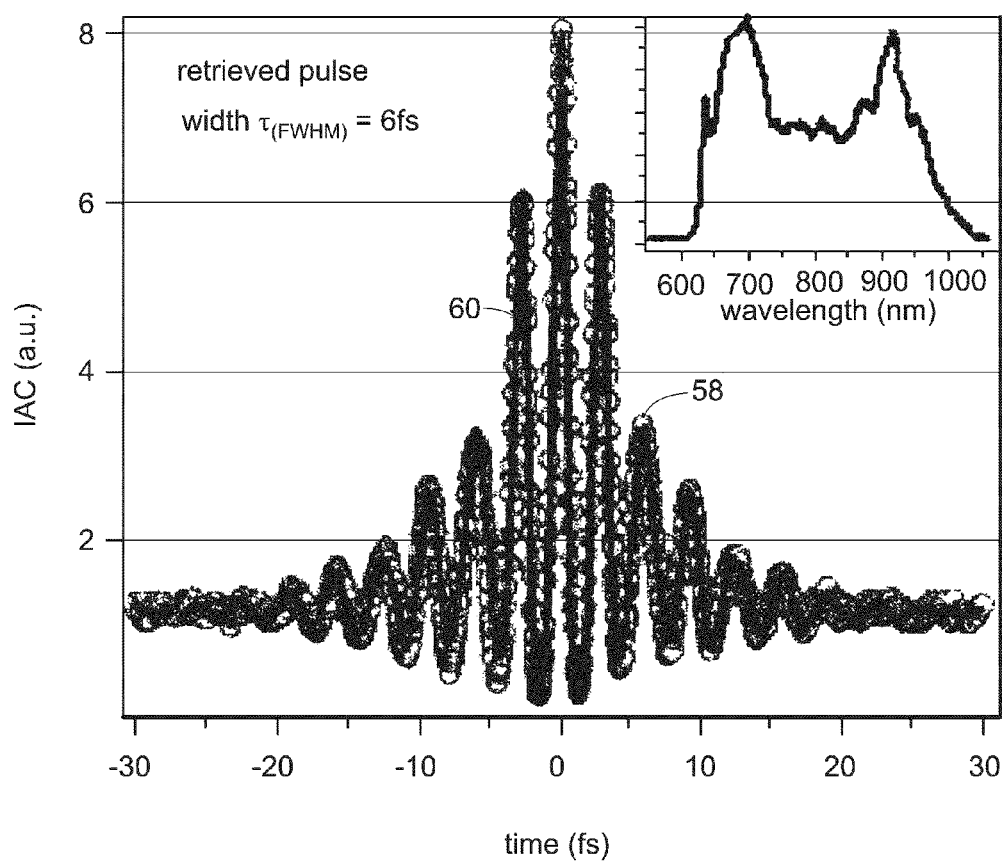
FIG. 6 is a graph showing a measured and retrieved autocorrelation revealing a pulse duration of 6 fs; the inset shows the laser spectrum on a linear scale.

The graph in FIG. 6 includes measured (represented by background circles 54) and retrieved (represented by the overlaid line 60) interferometric autocorrelation without the plates. The inset in FIG. 6 shows the laser spectrum on a linear scale. A phase retrieval leads to an estimated pulse duration of 6 fs. After placing the plates 30 into the autocorrelator 36, the carrier-envelope phase is tuned to an integer multiple of the carrier-envelope phase in the second arm 46, producing a symmetric single-peak trace as expected from the theory. It is interesting to notice how this interferometric autocorrelation trace [shown in FIG. 7(c)] resembles the measurement without the plates [shown in FIG. 7(a)], which means the composite plate 30 does not cause any cognizable harm in terms of dispersion management.

Figure 7:
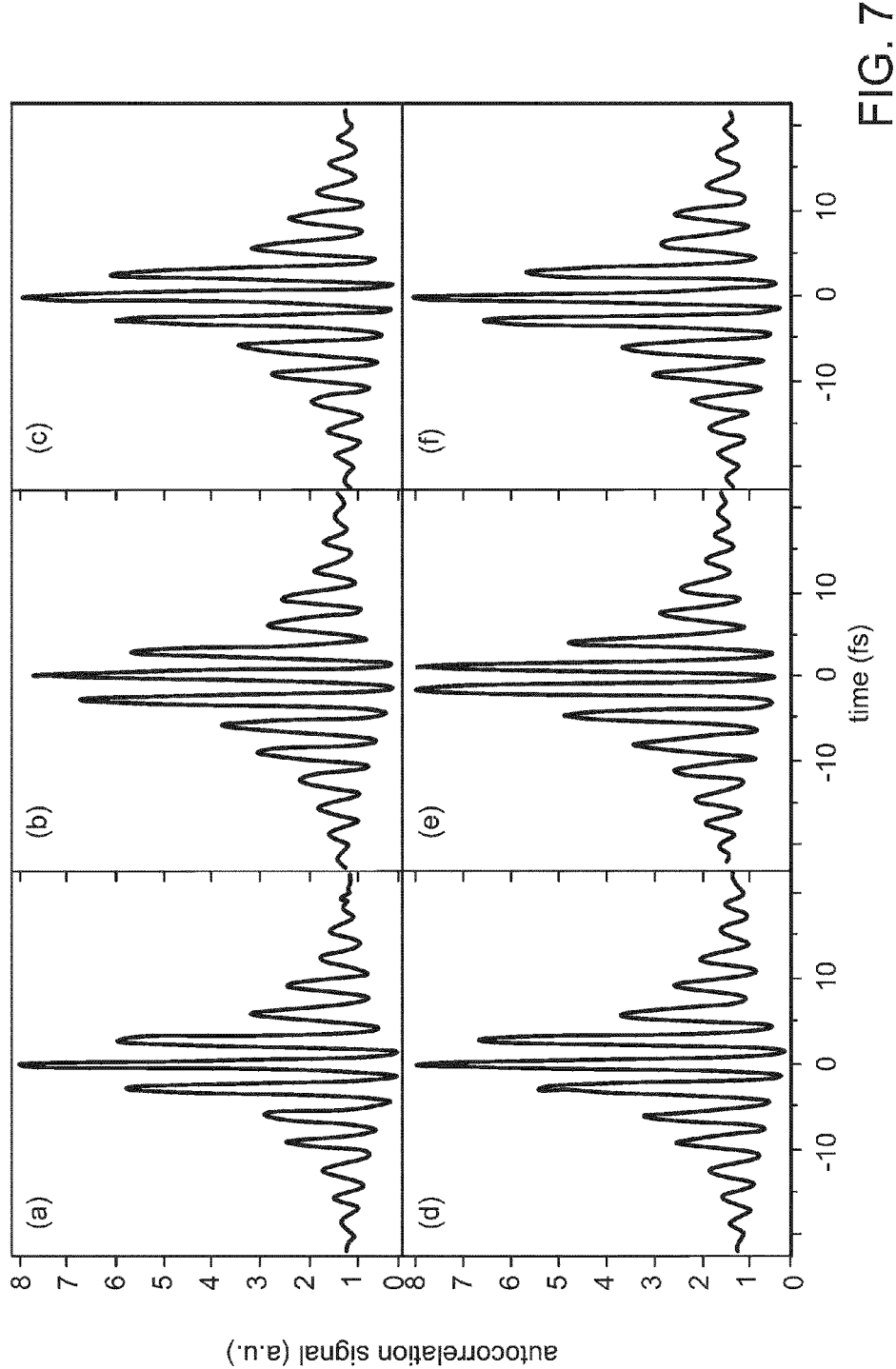
FIG. 7($a$) shows the interferometric autocorrelation before insertion of the plates for comparison, while FIG. 7($b$)-($f$) show a series of interferometric autocorrelation measurements with monotonically varying plate position corresponding to a carrier-envelope phase shift in steps of $\pi/2$.

A series of measurements was taken, where the position of the composite plate 30 was varied in steps of 4 mm, corresponding to shifts of the carrier-envelope phase of $\pi/2$. FIG. 7(a) charts the interferometric autocorrelation before insertion of the plates 30 for comparison, while FIG. 7(b)-(f) present a series of interferometric autocorrelation measurements with monotonically varying plate position corresponding to a carrier-envelope phase shift in steps of π/2. During this measurement, we noticed that the composite plate 30 exhibited structural inhomogeneities that changed the alignment of the autocorrelator 36. After moving the composite plate 30 a few millimeters, the autocorrelator 36 was realigned by adjusting one of the silver mirrors 52 in the arm 42 with the composite plate 30. After doing so, the original power level was always obtained within 10%. The observed structural inhomogeneities were due to difficulties in the manufacturing process reported by the manufacturer—specifically, difficulties in fabricating the relatively thin fused silica part 28 of the plate 30 and gluing it to the soft $BaF_2$ 26 while keeping the specifications and high optical quality in terms of polishing and wave front distortion. The total loss of the composite plate 30, however, is the same as for a regular $BaF_2$ plate 44, as observed when tested inside the laser cavity. Since, in this experiment, the composite plate 30 was moved 16 mm to obtain a phase shift of 2π and since we know from Eq. (2) that this must correspond to removal of 200 μm of $BaF_2$ 26 (and addition of 200 μm of fused silica 28), we deduce a wedge angle of 0.72°.

D) Varying $f_{CEO}$ in a 200-MHz Octave-Spanning Femtosecond Laser

After the successful test of the composite plate 30 in the autocorrelator 36, the composite plate was implemented into a 200-MHz octave-spanning Ti:sapphire laser [as described in O. D. Mücke, et al., "Self-Referenced 200 MHz Octave-Spanning Ti:Sapphire Laser with 50 Attosecond Carrier-Envelope Phase Jitter," 13 Opt. Express 51623 (2005)]. The composite plate was part of the dispersion management of the laser cavity and was placed into the short arm of the z-folded asymmetric, standing wave resonator. In the other arm two wedged $BaF_2$ plates are located for optimization of intracavity dispersion.

Figure 8:
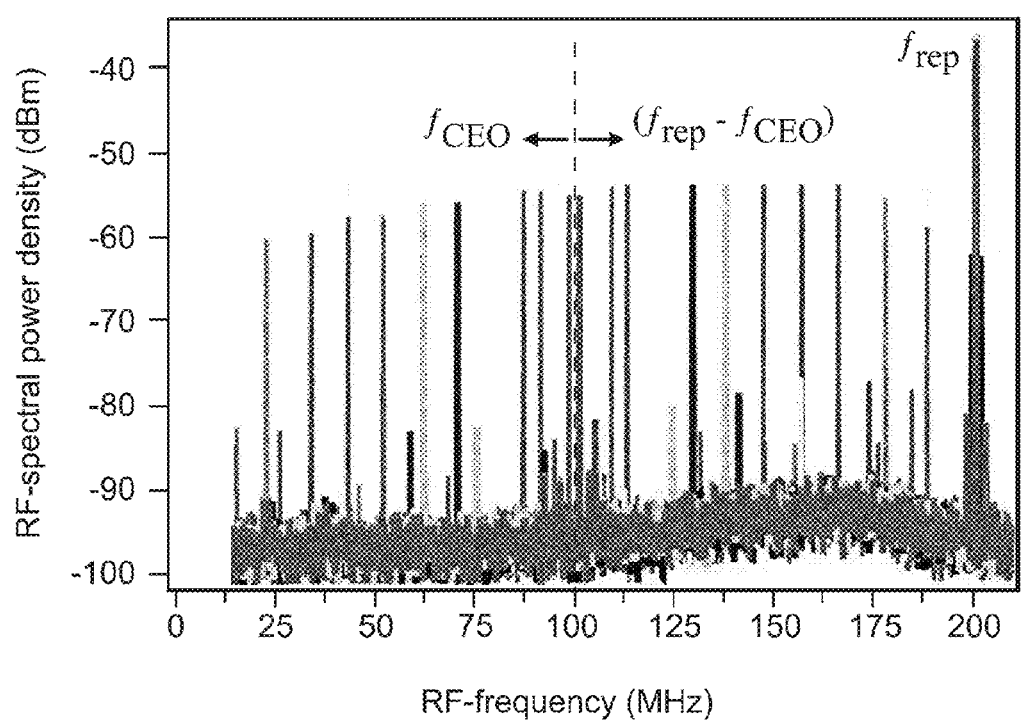
FIG. 8 is a graph providing a sequence of measurements illustrating the arbitrary choice of the carrier-envelope-offset frequency, $f_{CEO}$, by varying the position of the plates inside the laser cavity of an octave-spanning 200 MHz laser.

Use of the composite plate assumes optimization of the dispersion of the cavity to maximize the signal-to-noise ratio of the $f_{CEO}$ beat signal. After doing so, dispersion should stay unaltered, though the composite plate affords one the advantageous ability to freely choose the exact value of $f_{CEO}$. FIG. 8 illustrates how $f_{CEO}$ was varied over half the repetition rate ($f_{rep}/2$). Initially, $f_{CEO}$ and its mixing product with the repetition frequency ($f_{rep}-f_{CEO}$) were close to half the repetition rate. By moving the composite plate stepwise by 0.2 mm, a series of measurements were registered until $f_{CEO}$ was close to the repetition frequency, $f_{rep}$. The initial signal-to-noise ratio was about 35 dB and stayed practically unaltered until closing in on $f_{CEO}=f_{rep}$. During the measurement sequence, the laser stayed in mode-locked operation and did not need any kind of realignment.

Figure 9:
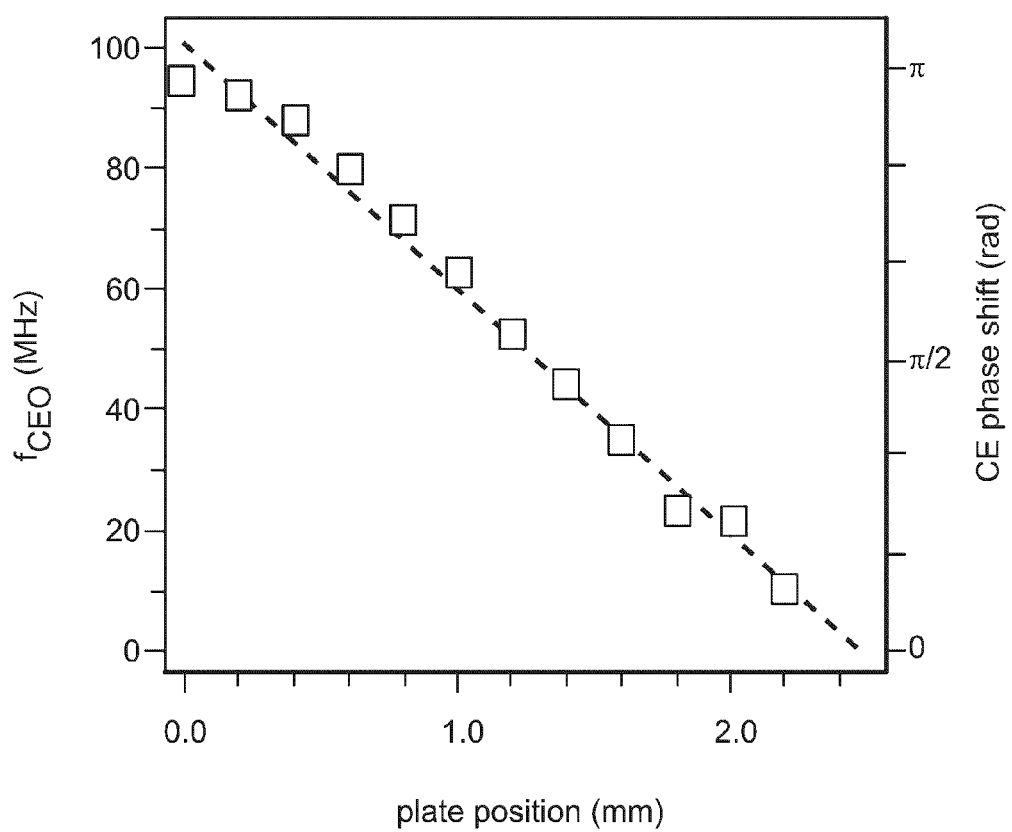
FIG. 9 is a plot illustrating variation of the carrier-envelope-offset frequency, $f_{CEO}$, as a function of the plate position.

In FIG. 9, the carrier-envelope-offset frequency, $f_{CEO}$, is plotted against the position of the composite plate, where the right vertical axis is normalized to the carrier-envelope phase shift per roundtrip. A linear fit to the data results in an inverse slope of 4.93 mm. Taking into account a factor of two for the double pass inside the laser and another factor of 1.2 due to Brewster's angle, we end up with a value of 11.83 mm per 2π phase shift. In comparison to the result of 16 mm/2π in the interferometric autocorrelation investigation, we obtain a stronger gradient. There are several explanations for this observation. First, the two plates used for the two experiments were not the same and deviations may be due to fabrication tolerances. Second, the deviations may be due to the above-mentioned inhomogeneities.

Figure 10:
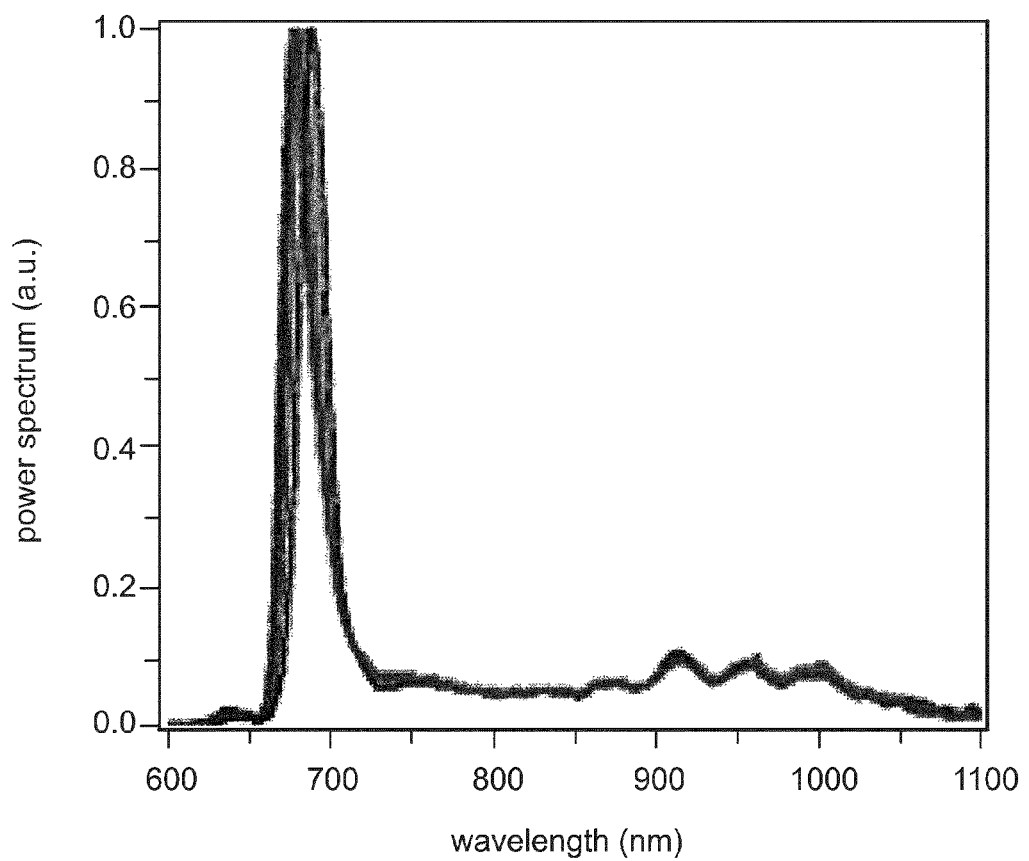
FIG. 10 is a graph illustrating the optical laser spectrum of the usable laser output after transmission of the spectral wings for carrier-envelope-offset frequency control.

Ti:sapphire pulse energy and laser beam properties also vary when moving the plate and, hence, influence the value of $f_{CEO}$. This influence manifests itself in a strong variation in the local slope of the data set in the graph of FIG. 9. FIG. 10 displays the corresponding optical laser spectrum for each of the data points shown in FIG. 8. All spectra of the twelve data points taken are shown; though for the last three data points close to $f_{CEO}=0$, the spectra exhibit slight modifications visible around the prominent peak around 680 nm due to inhomogeneities of the "phase-plate". Only the last two data points are close to $f_{CEO}=f_{rep}$, corresponding to the deviation form the original spectrum at the beginning of the tuning range in FIG. 10. Average power and, equivalently, the pulse energy only varied within 10% over the whole tuning range, except again for the last two data points which we attribute to the imperfectness of the plate due to structural inhomogeneities.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $\frac{1}{20}^{th}$, $\frac{1}{10}^{th}$, $\frac{1}{5}^{th}$, $\frac{1}{3}^{rd}$, $\frac{1}{2}$, etc, or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method for controlling carrier-envelope phase in an optical system that comprises:
    a first plate positioned in the optical path, wherein the first plate has a thicker portion and a thinner portion with a range of thicknesses there between, and wherein the first plate has a refractive index, second order dispersion, and a first ratio of group and phase velocities for the optical pulses; and
    a second plate positioned in the optical path, wherein the second plate has a thicker portion and a thinner portion with a range of thicknesses there between, wherein the thicker portion of the second plate is aligned with the thinner portion of the first plate, measured parallel to the optical path, and wherein the thinner portion of the second plate is aligned with the thicker portion of the first plate, measured parallel to the optical path, and wherein the second plate has a refractive index and second order dispersion that are substantially the same as the refractive index and second order dispersion of the first plate, and a second ratio of group and phase velocities for the optical pulses, wherein the second ratio is substantially different from the first ratio; the method comprising:

generating a train of optical pulses;

transmitting the train of optical pulses along the optical path through the first and second plates, the optical pulses including a lower-frequency envelope and a higher-frequency carrier within the envelope and shifting the relative position of the carrier with respect to the envelope by changing the position of the first and second plates relative to the light path to change the ratio of the thicknesses of the first and second plates through which the train of optical pulses pass.

2. The method of claim 1, wherein the change of position reduces an offset of the carrier with respect to the envelope.

3. The method of claim 1, wherein the change of position results in substantially no change in pulse energy, spectrum, shape or duration of the optical pulses in the train.

4. The method of claim 1, wherein the first and second plates are positioned in a first arm of an interferometric autocorrelator with first and second arms, and wherein the optical pulse train is split among the first and second arms, the change in position of the first and second plates varying the carrier-envelope phase of the optical pulse train in the first arm with respect to the optical pulse train in the second arm.

5. The method of claim 1, wherein the combined thickness of the plates is between 1 and 2 mm.

6. The method of claim 1, wherein the train of optical pulses is generated in a laser.

7. The method of claim 1, wherein the train of optical pulses has a pulse length of 2.5 to 7.5 femtoseconds.

8. The method of claim 1, wherein the second plate comprises silica glass; and the first plate comprises barium fluoride.

9. An optical system for controlling a carrier-envelope phase comprising:

a light source configured to generate a train of optical pulses along an optical path;

a first plate positioned in the optical path, wherein the first plate has a thicker portion and a thinner portion with a range of thicknesses there between, and wherein the first plate has a refractive index, second order dispersion, and a first ratio of group and phase velocities for the optical pulses; and a second plate positioned in the optical path, wherein the second plate has a thicker portion and a thinner portion with a range of thicknesses there between, wherein the thicker portion of the second plate is aligned with the thinner portion of the first plate, measured parallel to the optical path, and wherein the thinner portion of the second plate is aligned with the thicker portion of the first plate, measured parallel to the optical path, and wherein the second plate has a refractive index and second order dispersion that are substantially the same as the refractive index and second order dispersion of the first plate, and a second ratio of group and phase velocities for the optical pulses, wherein the second ratio is substantially different from the first ratio; and a displacement mechanism coupled with the first and second plates to displace the plates in a plane orthogonal to the light path.

10. The optical system of claim 5, wherein the combined thickness of the plates is between 1 and 2 mm.

11. The optical system of claim 5, wherein the light source is a laser.

12. The optical system of claim 5, wherein the light source is configured to generate a train of optical pulses with a pulse length of 2.5 to 7.5 femtoseconds along an optical path.

13. The optical system of claim 5, wherein the second plate comprises silica glass.

14. The optical system of claim 13, wherein the silica is fused silica.

15. The optical system of claim 13, wherein the first plate comprises barium fluoride.

16. The optical system of claim 5, wherein the first and second plates are both wedge shaped, though inversely oriented with respect to one another.

17. An optical system for controlling a carrier-envelope phase comprising:

a light source configured to generate a train of optical pulses along an optical path;

a first plate positioned in the optical path, wherein the first plate has a thicker portion and a thinner portion with a range of thicknesses there between, and wherein the first plate has a refractive index, second order dispersion, and a first ratio of group and phase velocities for the optical pulses; and a second plate positioned in the optical path, wherein the second plate has a thicker portion and a thinner portion with a range of thicknesses there between, wherein the thicker portion of the second plate is aligned with the thinner portion of the first plate, measured parallel to the optical path, and wherein the thinner portion of the second plate is aligned with the thicker portion of the first plate, measured parallel to the optical path, and wherein the second plate has a refractive index and second order dispersion that are substantially the same as the refractive index and second order dispersion of the first plate, and a second ratio of group and phase velocities for the optical pulses, wherein the second ratio is substantially different from the first ratio, wherein the system is an interferometric autocorrelator with two arms, and wherein the plates are in one arm of the interferometric autocorrelator.

* * * * *